US009742647B2

(12) United States Patent
Kazmi et al.

(10) Patent No.: US 9,742,647 B2
(45) Date of Patent: Aug. 22, 2017

(54) REPORTING SERVING CELL PACKET LOSS RATE

(71) Applicant: Telefonaktiebolaget L M Ericsson (publ), Stockholm (SE)

(72) Inventors: Muhammad Kazmi, Bromma (SE); Christopher Callender, Kinross (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 14/408,326

(22) PCT Filed: Nov. 7, 2014

(86) PCT No.: PCT/SE2014/051321
§ 371 (c)(1),
(2) Date: Dec. 16, 2014

(87) PCT Pub. No.: WO2015/115956
PCT Pub. Date: Aug. 6, 2015

(65) Prior Publication Data
US 2016/0269260 A1    Sep. 15, 2016

Related U.S. Application Data

(60) Provisional application No. 61/933,949, filed on Jan. 31, 2014.

(51) Int. Cl.
| | |
|---|---|
| *H04L 1/00* | (2006.01) |
| *H04W 24/08* | (2009.01) |
| *H04W 72/08* | (2009.01) |
| *H04L 12/26* | (2006.01) |

(Continued)

(52) U.S. Cl.
CPC ........ *H04L 43/0829* (2013.01); *H04L 1/0027* (2013.01); *H04L 1/20* (2013.01); *H04W 24/08* (2013.01); *H04W 24/10* (2013.01); *H04W 72/085* (2013.01); *H04L 1/0026* (2013.01)

(58) Field of Classification Search
CPC .... H04L 43/0829; H04L 1/0018; H04L 47/27
See application file for complete search history.

(56) References Cited

U.S. PATENT DOCUMENTS

| | | | |
|---|---|---|---|
| 6,795,400 B1 * | 9/2004 | Schick | ............... H04L 41/5003 370/236 |
| 8,730,806 B2 * | 5/2014 | Zhang | .................... H04L 47/22 370/232 |
| 2009/0274204 A1 | 11/2009 | Chen et al. | |

(Continued)

OTHER PUBLICATIONS

PCT Notification of Transmittal of the International Search Report and the Written Opinion of the International Searching authority, or the Declaration for International application No. PCT/SE2014/051321, Jan. 27, 2015.

(Continued)

*Primary Examiner* — Xavier Szewai Wong
(74) *Attorney, Agent, or Firm* — Baker Botts, LLP

(57) ABSTRACT

According to one embodiment, an apparatus may include a memory and a processor. The memory may store control information. The processor may determine, based at least in part upon the control information, an expected packet loss rate associated with performing a radio operation. The processor may then communicate the expected packet loss rate to a network node.

22 Claims, 5 Drawing Sheets

(51) Int. Cl.
*H04L 1/20* (2006.01)
*H04W 24/10* (2009.01)

(56) References Cited

U.S. PATENT DOCUMENTS

| | | |
|---|---|---|
| 2012/0250558 A1 | 10/2012 | Chung et al. |
| 2013/0024901 A1* | 1/2013 | Sharif-Ahmadi . G06F 17/30017 725/114 |
| 2013/0094392 A1* | 4/2013 | Kim ...................... H04L 1/0026 370/252 |
| 2013/0242735 A1* | 9/2013 | Koc .................... H04W 52/243 370/232 |
| 2015/0029863 A1* | 1/2015 | Lai ......................... H04L 47/12 370/237 |
| 2015/0288594 A1* | 10/2015 | Yin ....................... H04W 24/04 370/252 |

OTHER PUBLICATIONS

3GPP TSG RAN WG2 #60; Jeju, Korea; Title: Relation between DRX and Gap for Measurement; R2-074856, Nov. 5-9.

* cited by examiner

REPORTING SERVING CELL PACKET LOSS RATE

PRIORITY

This nonprovisional application is a U.S. National Stage Filing under 35 U.S.C. §371 of International Patent Application Ser. No. PCT/SE2014/051321, filed Nov. 7, 2014 and entitled "REPORTING SERVING CELL PACKET LOSS RATE" which claims priority to U.S. Provisional Patent Application No. 61/933,949 filed Jan. 31, 2014, both of which are hereby incorporated by reference in their entirety.

TECHNICAL FIELD

Particular embodiments relate generally to reporting serving cell packet loss rate. In certain embodiments, the disclosure relates to an apparatus, a network node and methods therein for reporting cell packet loss rate.

BACKGROUND

In a telecommunications network, mobile devices may communicate wirelessly with network nodes such as towers, base transmitters, base receivers, base stations, and/or base transceivers. Each network node may serve one or more cells. Each cell or network node may be associated with a different operating frequency. A mobile device is considered to be communicating in a cell or with a network node when the radio and/or antenna in the mobile device is tuned to communicate over the operating frequency associated with the cell or network node. Some mobile devices may include radios and/or antennas that allow the mobile device to communicate over multiple cells or network nodes.

In some instances, the mobile device may perform a radio operation that may cause the mobile device to fail to receive packets from the network. For example, a mobile device may be communicating with a first network node when the mobile device determines that it should measure the signal strength between the mobile device and a second network node. In order to measure the strength of that signal, the mobile device would retune its radio to communicate over the frequency associated with the second network node. During the time that the mobile device retunes its radio and/or measures the signal strength, the mobile device may fail to receive packets sent by the first network node. As another example when the mobile device is capable of communicating over multiple cells, the mobile device may activate and/or deactivate its connection to one or more cells. The mobile device may retune its radio to activate and/or deactivate these connections. During the time that the mobile device retunes its radio, the mobile device may fail to receive packets sent through another active cell. Maintaining good signal quality between the wireless device and the radio network node may allow for good performance, such as high bitrate transmissions or robust control channel performance. However, it may be difficult to maintain good signal quality in complex radio environments.

SUMMARY

According to one embodiment, an apparatus may include a memory and a processor. The memory may store control information. The processor may determine, based at least in part upon the control information, an indication of an expected packet loss rate associated with performing a radio operation. The processor may then communicate the indication of the expected packet loss rate to a network node.

According to another embodiment, a method may be performed by a mobile device. The mobile device may store, by a memory, control information. The mobile device may then determine, by a processor, based at least in part upon the control information, an indication of an expected packet loss rate associated with performing the radio operation. The expected packet loss rate may be the packet loss rate that is expected to occur if the radio operation is performed. The mobile device may then communicate the indication of the expected packet loss rate to a network node.

According to yet another embodiment, a network node may include a memory and a processor. The processor may receive an indication of an expected packet loss rate associated with performing a radio operation. The processor may then determine, based at least in part upon the control information and the indication of the expected packet loss rate, information about a procedure for performing the radio operation, and communicate the information about the procedure.

According to another embodiment, a method may be performed by a network node. The network node may receive an indication of an expected packet loss rate associated with performing a radio operation. Then, the network node may determine, by a processor, based at least in part the indication of the expected packet loss rate, information about a procedure for performing the radio operation, and communicate the information about the procedure to a mobile device.

Certain embodiments may provide one or more technical advantages. A technical advantage of one embodiment includes reducing packet loss over a telecommunications network. Another technical advantage of one embodiment includes improved scheduling of packet transmissions over the network. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

This disclosure describes an apparatus and method for reporting serving cell packet loss rate. In a telecommunications network, mobile devices may communicate wirelessly with network nodes such as towers, base transmitters, base receivers, base stations, and/or base transceivers. Each network node may serve one or more cells. Each cell or network node may be associated with a different operating frequency.

A mobile device is considered to be communicating in a cell or with a network node when the radio and/or antenna in the mobile device is tuned to communicate over the operating frequency associated with the cell or network node. Some mobile devices may include radios and/or antennas that allow the mobile device to communicate over multiple cells or network nodes.

In some instances, the mobile device may perform a radio operation that may cause the mobile device to fail to receive packets from the network. For example, a mobile device may be communicating with a first network node when the mobile device determines that it should measure the signal strength between the mobile device and a second network node. In order to measure the strength of that signal, the mobile device would retune its radio to communicate over the frequency associated with the second network node. During the time that the mobile device retunes its radio and/or measures the signal strength, the mobile device may fail to receive packets sent by the first network node. As another example when the mobile device is capable of communicating over multiple cells, the mobile device may activate and/or deactivate its connection to one or more cells. The mobile device may retune its radio to activate and/or deactivate these connections. During the time that the mobile device retunes its radio, the mobile device may fail to receive packets sent through another active cell.

To help reduce the amount of packet loss that occurs when a mobile device performs particular radio operations, the mobile device and/or the network may determine and/or evaluate an expected packet loss rate associated with the radio operation. The expected packet loss rate may be the packet loss rate that may occur if the radio operation is performed. For example, before the mobile device performs the radio operation, the mobile device may determine the expected packet loss rate associated with performing that operation. The mobile device may then communicate the expected packet loss rate to the network. Based on that information, the network may hold packets so that they are not transmitted during a time when the mobile device is expected to fail to receive those packets. When the radio operation is complete, the network may release those packets to be transmitted to the mobile device. In this manner, packet loss associated with performing radio operations may be reduced. The mobile device, the network, and their operation will be described in more detail with respect to FIGS. 1-5.

Figure 1:
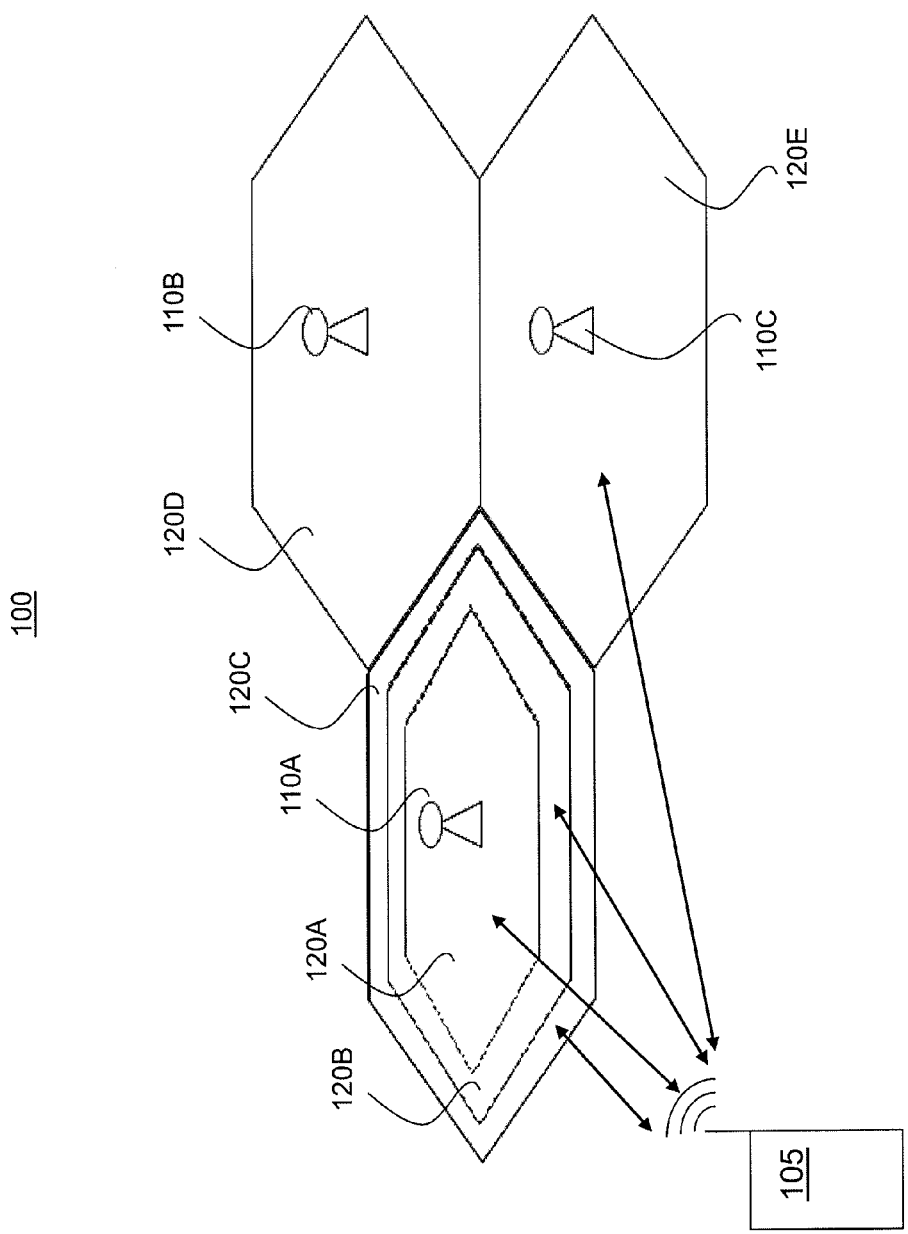
FIG. 1 is a block diagram illustrating an example embodiment of a network.

FIG. 1 is a block diagram illustrating an embodiment of a network 100. Network 100 may include one or more network nodes 110A, 110B and 110C. Each network node 110A, 110B, and 110C may serve one or more cells 120A, 120B, 120C, 120D, and 120E. This disclosure contemplates network 100 including any suitable number of network nodes 110 serving any suitable number of cells 120.

Each cell 120 may operate over a different frequency than other nearby cells 120. For example, cell 120A may operate over a different frequency than cells 120B, 120C, 120D, and 120E. To communicate in cell 120A, a mobile device 105 would communicate over the frequency associated with cell 120A within range of network node 110A. Even though geographically, cell 120A overlaps cell 120B, mobile device 105 may communicate in cell 120A without communicating in cell 120B by choosing to communicate over only the frequency associated with cell 120A.

Mobile unit 105 may communicate with network 100 through any network node 110. Mobile device 105 may include one or more of a radio, an antenna, a transmitter, a receiver, and/or a transceiver that allows mobile device 105 to communicate wirelessly with network 100. Mobile device 105 may tune its radio to communicate in any cell 120 of network 100. For example, mobile device 105 may communicate in cell 120A by tuning its radio to communicate over the frequency associated with cell 120A. This disclosure contemplates mobile device 105 including any suitable number of radios, antennas, transmitters, receivers, and/or transceivers. Furthermore, although this disclosure describes mobile device 105 tuning its radio to communicate with network 100, this disclosure contemplates mobile device 105 adjusting any suitable components such as an antenna, transmitter, receiver and/or transceiver to communicate over network 100.

Mobile device 105 may perform particular radio operations when communicating with network 100. For example, mobile device 105 may be communicating through network node 110A and determine that it should measure the signal strength between itself and network node 110C. Because network node 110C may operate over a frequency that is different than the frequency used by mobile device 105 to communicate with network node 110A, mobile device 105 may retune its radio to measure the signal strength between mobile device 105 and network node 110C. However, during the time that mobile device 105 retunes its radio and/or measures the signal strength, mobile device 105 may fail to receive packets communicated by network node 110A. As another example, mobile device 105 may be communicating in cell 120A and determine that it should activate its connection with cell 120B so that mobile device 105 may communicate in both cells 120A and 120B. Mobile device 105 may retune its radio in order to activate this connection. During the time that mobile device retunes its radio, mobile device 105 may fail to receive packets communicated in cell 120A. Mobile device 105 may perform any suitable radio operation. Mobile device 105 may perform radio operation on any appropriate component of network 100, such as cells 120 and/or network node 110, for example.

In particular embodiments, network 100 and mobile device 105 may coordinate the performance of certain radio operations and/or the transmission of certain packets based on information sent by mobile device 105 to reduce the number of packets that mobile device 105 may fail to receive when it performs the radio operations. Generally, mobile device 105 may determine and/or communicate a particular set of information to network 100 before mobile device 105 performs the radio operation. Based on that information, network 100 may determine and/or communicate to mobile device 105 a procedure for performing the radio operation. Mobile device 105 may then perform the radio operation according to those procedures. In particular embodiments, by performing the radio operation according to the procedures, packet loss over network 100 may be reduced.

Mobile device 105 may determine and/or store control information in particular embodiments. As an example, mobile device 105 may log and store statistics for packet loss associated with performing particular radio operations. The statistics may include the packet loss caused by previous performances of particular radio operations. The statistics may also include the duration of time over which those packet losses occurred, the network nodes 110 over which those packet losses occurred, the cells 120 in which those packet losses occurred, the range of frequencies and/or frequency bands in which those packet losses occurred, and/or the direction of transmission (e.g., uplink and/or downlink) of packets in which the packet loss occurred. This disclosure contemplates the control information including any type of information appropriate for determining an expected packet loss rate, such as for example, information associated with configured carriers at mobile device 105.

Mobile device 105 may communicate control information to network 100 or a network node 110 in a particular embodiment. For example, mobile device 105 may communicate a duration over which the expected packet loss rate is determined. As another example, mobile device 105 may communicate a direction of transmission (uplink and/or downlink) of packets in which the expected packet loss rate is determined or a range of frequencies and/or a frequency band of the expected packet loss rate. As yet another example, mobile device 105 may communicate a cell on which a radio operation is to be performed and/or an indication whether the expected packet loss rate is based on a configuration of network nodes 110 and/or a capability of network nodes 110 or mobile device 105.

Mobile device 105 may determine an expected packet loss rate associated with performing a particular radio operation based at least in part upon the control information in particular embodiments. For example, mobile device 105 may be communicating with network 100 through network node 110A when mobile device 100 determines that it should measure the signal strength between itself and network node 110C. Before measuring that signal strength, mobile device 105 may determine an expected packet loss rate associated with measuring the signal strength between itself and network node 110C. Mobile device 105 may have logged and/or stored the packet loss that occurred with network node 110A the previous times that mobile device 105 measured the signal strength between itself and network node 110C. Based on that information, mobile device 105 may determine an expected packet loss rate caused by measuring the signal strength between itself and network node 110C. This disclosure contemplates mobile device 105 determining an expected packet loss rate associated with performing any suitable radio operation based upon any suitable control information.

The expected packet loss rate may measure the expected packet loss based on any suitable metric. For example, the expected packet loss rate may include a ratio of a number of lost packets to a number of transmitted packets over a period of time. As another example, the expected packet loss rate may include a number of expected missed acknowledgments in response to a transmission of packets over a period of time.

Mobile device 105 may communicate the expected packet loss rate to a network node 110. In some embodiments, mobile device 105 may communicate the expected packet loss rate if a particular condition is met. For example, the control information stored in mobile device 105 may include a threshold. Mobile device 105 may compare a determined expected packet loss rate to the threshold. Mobile device 105 may then communicate the expected packet loss rate if the expected packet loss rate exceeds that threshold. This disclosure contemplates mobile device 105 communicating the expected packet loss rate if the expected packet loss rate is less than or equal to the threshold.

In particular embodiments, mobile device 105 may communicate other information to a network node 110. For example, mobile device 105 may communicate a starting reference time of the expected packet loss rate. As another example, mobile device may communicate a duration of the expected packet loss rate. As yet another example, mobile device 105 may communicate a periodicity of the expected packet loss rate.

Network 100 may receive communications from mobile device 105. For example, network nodes 110 may receive an expected packet loss rate associated with performing a radio operation from mobile device 105. The communications may include any suitable information, such as for example, a duration over which the expected packet loss rate is determined a cell 120 on which the radio operation is to be performed and/or a range of frequencies or frequency band of the expected packet loss rate. This disclosure contemplates any component of network 100 receiving communications from mobile device 105.

Network 100 may determine a procedure for performing a radio operation based at least in part upon a received expected loss rate and control information stored in network 100. In particular embodiments, performing the radio operation according to the procedure may reduce the packet loss between network 100 and mobile device 105.

As an example, network 100 may receive an expected packet loss rate from mobile device 105. Network 100 may compare the expected loss rate with an acceptable packet loss rate stored on network 100. If the expected packet loss rate exceeds the acceptable packet loss rate, network 100 may determine a procedure for performing the radio operation to reduce the packet loss during the performance of the radio operation. In particular embodiments, network 100 may schedule a measurement gap or a period of time during which packets that are to be communicated between mobile device 105 and a network node 110 or a cell 120 are held for communication at a later time. Network 100 may determine a frequency at which the radio operation is to be performed. As an example, network 100 may determine that based on the expected packet loss rate, packets for mobile device 105 should not be communicated over the frequency associated with cell 120A for the next five milliseconds.

Network 100 may communicate the determined procedure to mobile device 105. Network 100 may communicate the procedure through a network node 110 that is in communication with mobile device 105. For example, if mobile device 105 is communicating through network node 110A and determines that it should measure the signal strength between itself and network node 110C, network 100 may communicate the procedure to mobile device 105 through network node 110A. As another example, if mobile device 105 is communicating over the frequency associated with cell 120A and determines that it should activate its connection with cell 120B, network 100 may communicate the procedure over the frequency associated with cell 120A.

In particular embodiments, network 100 may communicate the procedure to any appropriate component of network 100, such as network node 110. For example, if mobile device 105 is communicating with network 100 through network node 110A, network node 110A may forward the procedure to another network node 110B or 110C.

Mobile device 105 may receive a procedure for performing a radio operation from network 100 in response to communicating an expected loss rate to network 100. Mobile device 105 may then perform the radio operation according to the procedure. For example, the procedure may include a starting time at which mobile device 105 is to begin performing the radio operation. As another example, the procedure may include a stop time at which mobile device 105 should stop performing the radio operation. In particular embodiments, by performing the radio operation according to the procedure, mobile device 105 may help reduce the packet loss occurring over network 100.

In particular embodiments, mobile device 105 may perform radio operations on network nodes 110 that are not providing service to mobile device 105, such as for example, a non-serving carrier. Mobile device 105 may measure the signal strength between itself and the non-serving carrier. Mobile device 105 may then determine an expected packet loss rate caused by measuring the signal strength, such as the expected packet loss rate for communications through a network node 110 or cell 120 that is providing service to mobile device 105. Based on that expected packet loss rate, network 100 may determine that a packet to be sent through that network node 110 or cell 120 to mobile device 105 may be held for a period of time while mobile device 105 measures the signal strength between itself and the non-serving carrier.

Mobile device 105 may perform a radio operation on a cell 120. For example, mobile device 105 may active or deactivate its connection to a cell 120 that may provide services to mobile device 105, such as for example, a serving cell. Mobile device 105 may determine an expected packet loss rate caused by activating or deactivating such a connection. The expected packet loss rate may be the expected packet loss rate for packets communicated over the frequency of another serving cell. Network 100 may determine a procedure for activating and/or deactivating the connection. Mobile device 105 may activate or deactivate the connection according to that procedure to reduce the packet loss over the frequency associated with the other serving cell. This disclosure contemplates mobile device 105 communicating with and performing radio operations on any appropriate number of serving cells. Serving cells may also be known as primary cells, primary serving cells, secondary cells, and secondary serving cells.

This disclosure contemplates mobile device 105 performing any suitable radio operation. For example, mobile device 105 may perform an inter-frequency measurement without measurement gaps. As another example, mobile device 105 may configure, de-configure, active, or deactivate a serving cell. As yet another example, mobile device 105 may perform an inter-RAT measurement without measurement gaps.

In particular embodiments, network 100 may request that mobile device 105 communicate packet loss rate information and/or control information to network 100. For example, network 100 may communicate a request for an expected packet loss rate to mobile device 105. This disclosure contemplates network 100 requesting any suitable information such as control information from mobile device 105.

Mobile device 105 may receive the request from network 100 and communicate the appropriate information to network 100 in response to the request. For example, if the request is for an expected packet loss rate, mobile device 105 may determine and/or communicate the expected packet loss rate in response to receiving the request. Network 100 may then use the communicated information to better manage communications over network 100.

This disclosure contemplates network 100 using communicated information for any suitable purpose. For example, network 100 may determine that a cell 120 should be left in an activated or deactivated state based at least in part upon a received expected packet loss rate. As another example, network 100 may determine that mobile device 105 should not measure the signal strength between itself and a network node 110 for a period of time.

Figure 2:
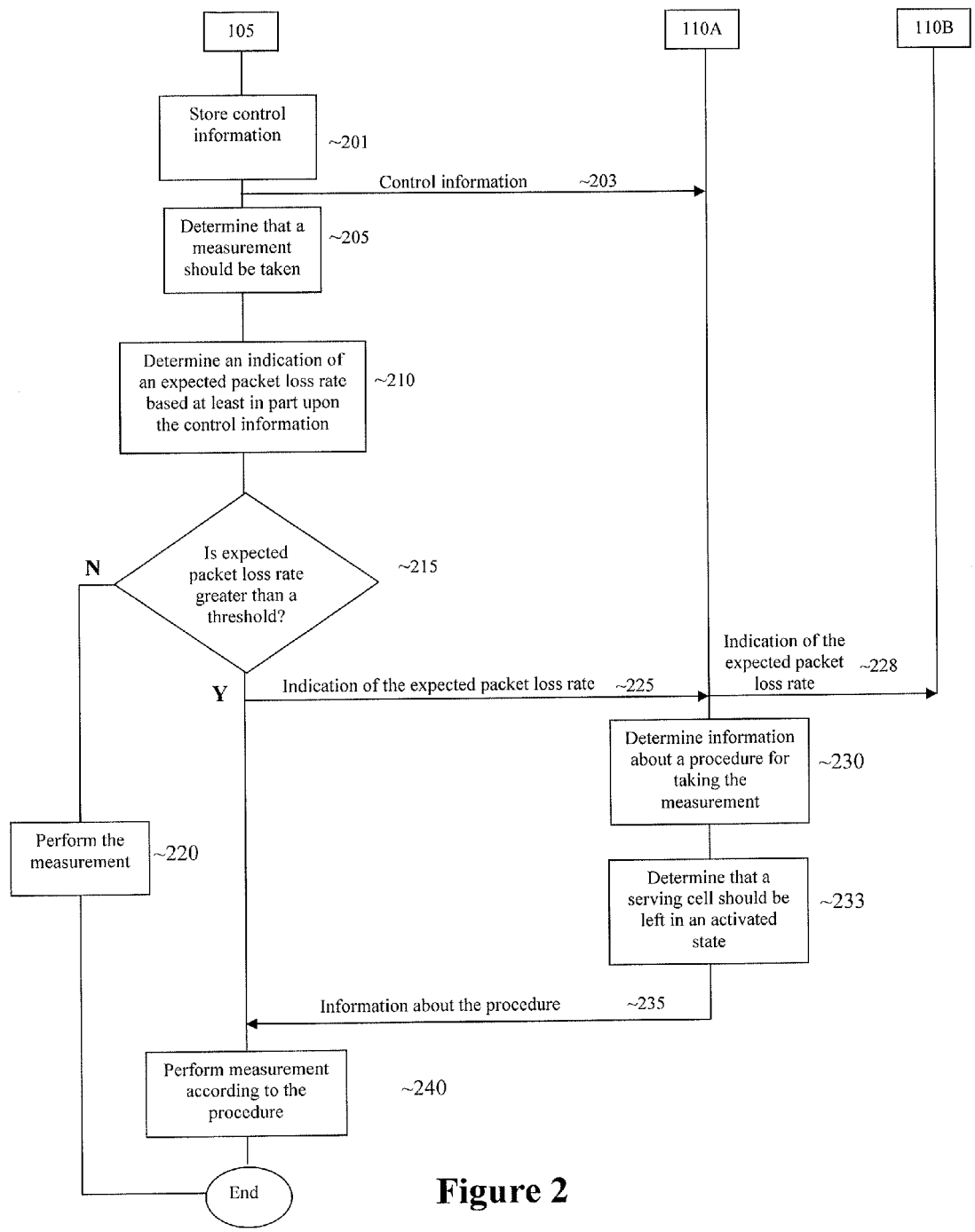
FIG. 2 is a signaling diagram illustrating an example exchange of signals in the network of FIG. 1.
Figure 3:
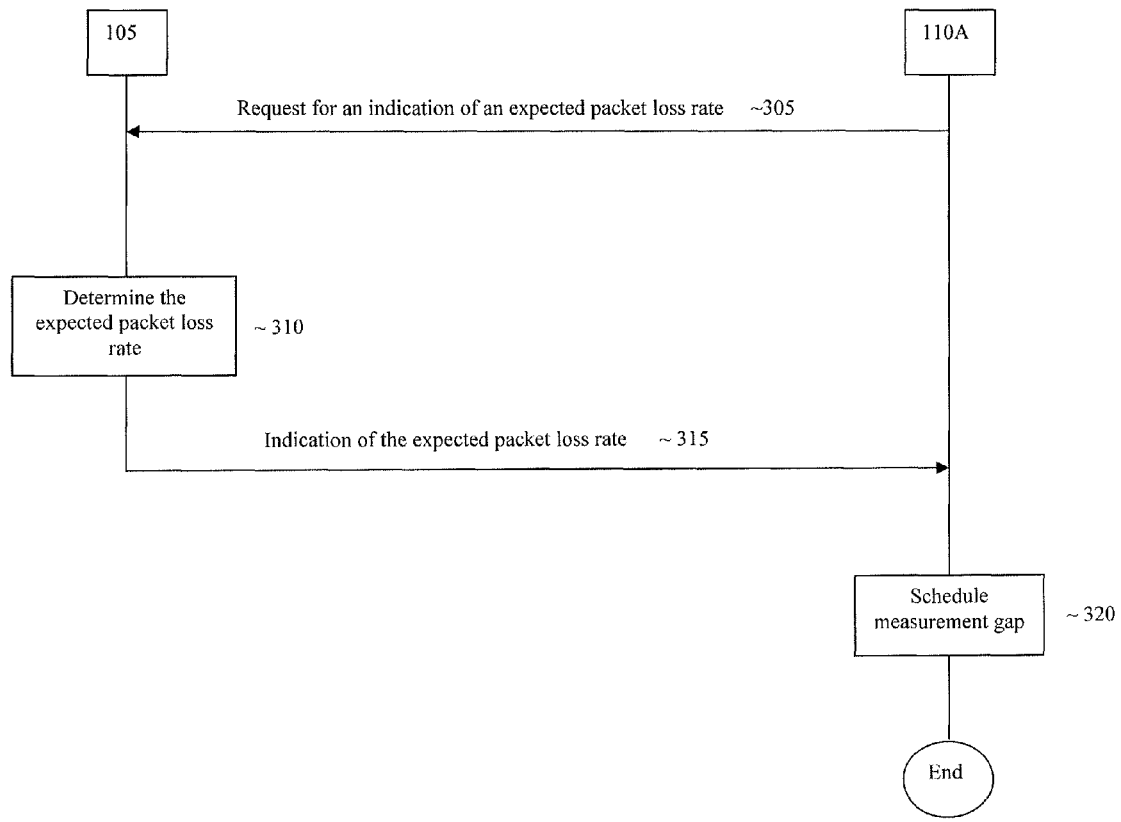
FIG. 3 is a signaling diagram illustrating an example exchange of signals in the network of FIG. 1.

FIGS. 2 and 3 illustrate one or more methods of reporting packet loss information performed by mobile device 105 and/or network 100. In particular embodiments, performance of these methods may reduce packet loss over network 100.

FIG. 2 is a signaling diagram illustrating an example exchange of signals in the network 100 of FIG. 1. As provided in FIG. 2, the exchange of signals may be between mobile device 105 and network node 110A. This disclosure contemplates mobile device 105 exchanging signals with any suitable component of network 100.

Mobile device 105 may store control information in step 201. The control information may be stored in a memory of mobile device 105. Mobile device 105 may communicate control information 203 to network 100 or to a network 110, such as network node 110A, in step 203. The control information may include, for example, a duration over which the expected packet loss rate is determined, a direction of transmission of packets in which the expected packet loss rate is determined, a serving cell on which the radio operation is to be performed, a frequency band of the expected packet loss rate, and an indication whether the expected packet loss rate is based on at least one of a configuration of carriers and a capability.

Mobile device 105 may determine that a radio operation should be performed. For example, mobile device 105 may determine that a measurement should be taken in step 205. The measurement may be a measurement of signal strength between mobile device 105 and another network node 110.

In step 210, mobile device 105 may determine an expected packet loss rate caused by performing the radio operation. In particular embodiments, mobile device 105 may determine the expected packet loss rate based upon control information stored within mobile device 105, such as for example, statistics.

Mobile device 105 may then determine whether the expected packet loss rate is greater than a stored threshold in step 215. The threshold may be stored within mobile device 105. If the expected packet loss rate is not greater than the threshold, mobile device 105 may proceed to perform the measurement in step 220. If the expected packet loss rate is greater than the threshold, mobile device 105 may communicate the expected packet loss rate to network node 110A in step 225. Mobile device 105 may communicate an indication of the expected packet loss rate. The indication of the expected packet loss rate may include, for example, the expected packet loss rate, a starting reference time of the expected packet loss rate, a duration of the expected packet loss rate, and a periodicity of the expected packet loss rate. Mobile device 105 may communicate information that includes the expected packet loss rate to network node 110A. Network node 110A may then receive the expected packet loss rate and/or the indication of the expected packet loss rate from mobile device 105. Network node 110A may forward the indication of the expected packet loss rate to another network node, such as network node 110B, in step 228.

In step 230, network node 110A may determine a procedure for performing the radio operation. For example, network node 110A may determine a time at which the measurement should be taken. As another example, network node 110A may schedule measurement gaps or times during which packets that are to be sent to mobile device 105 may be held for later transmittal. After network node 110A determines the procedure, it may communicate the procedure to mobile device 105 in step 235.

Network node 110A may also determine that a serving cell should be left in an activated state in step 233. In particular embodiments, network node 110A may make this determination based on the indication of the expected packet loss rate.

After mobile device 105 receives the procedure, mobile device 105 may perform the radio operation according to the procedure in step 240. For example, mobile device 105 may measure the signal strength according to the procedure in step 240. In particular embodiments, by performing the radio operation according to the procedure, packet loss over network 100 may be reduced.

FIG. 3 is a signaling diagram illustrating an example exchange of signals in the network 100 of FIG. 1. As provided in FIG. 3, the exchange of signals may be between mobile device 105 and network node 110A.

In step 305, network node 110A may communicate a request for an indication of an expected packet loss rate to mobile device 105. The request may specify a radio operation associated with the expected packet loss rate.

After mobile device 105 receives the request, mobile device may determine the expected packet loss rate in step 310. Mobile device 105 may determine the expected packet loss rate based on any appropriate information such as control information stored in mobile device 105. For example, mobile device 105 may determine an expected packet loss rate based on statistics about performing a particular radio operation. After mobile device 105 determines the expected packet loss rate, mobile device 105 may communicate the indication of the expected packet loss rate to network node 110A in step 315.

After receiving the expected packet loss rate, network node 110A may use the expected packet loss rate to improve packet loss over network 100. For example, in step 320, network node 110A may schedule a measurement gap or a time during which packets from network node 110A to mobile device 105 should not be communicated.

As described above, embodiments of network 100 may include one or more mobile devices 105 and one or more different types of network nodes 110 capable of communicating with mobile devices 105. Network 100 may also include any additional elements suitable to support communication between mobile devices 105 or between mobile device 105 and another communication device (such as a landline telephone). Mobile device 105 may include any suitable combination of hardware and/or software. For example, in particular embodiments, mobile device 105 may include the components described with respect to FIG. 4 below. Similarly, network node 110 may include any suitable combination of hardware and/or software. For example, in particular embodiments, network node 110 may include the components described with respect to FIG. 5 below.

Figure 4:
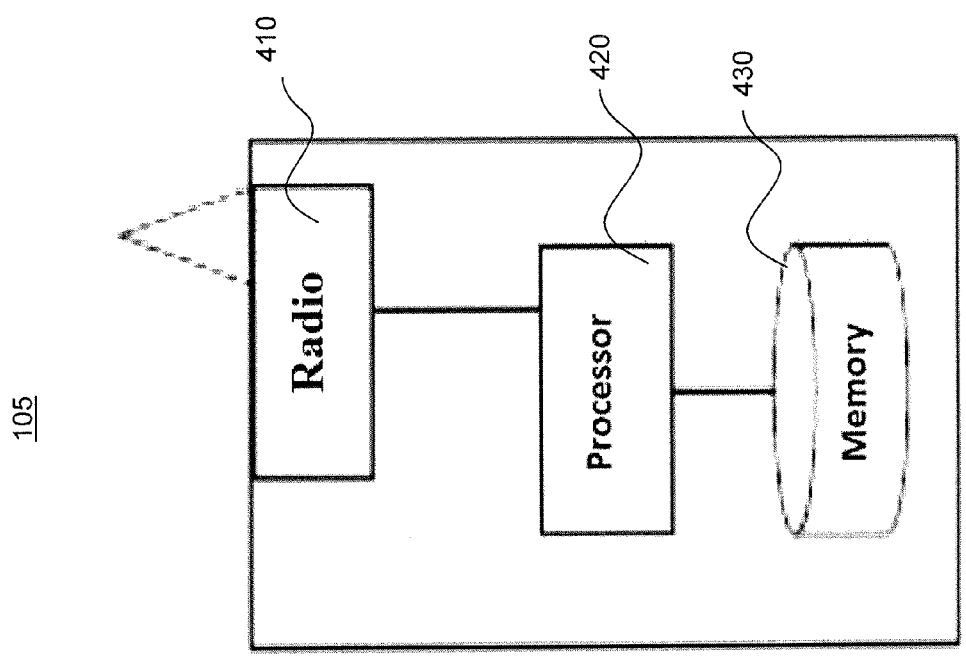
FIG. 4 is a block diagram illustrating an example embodiment of a mobile device of the network of FIG. 1.

FIG. 4 is a block diagram illustrating an example embodiment of a mobile device 105 of the network 100 of FIG. 1. As illustrated in FIG. 4, mobile device 105 may include radio 410, processor 420, and memory 430. This disclosure contemplates mobile device 105 including any appropriate number of radios 410, processors 420, and memories 430. Mobile device 105 may use each of transceiver 420, processor 420, and memory 430 alone or in combination to perform any of the functions described here and as being performed by mobile unit 105. For example, in some embodiments, radio 410 facilitates transmitting wireless signals to and receiving wireless signals from a network node 110 (e.g., via an antenna), processor 420 executes instructions to provide some or all of the functionality described above as being provided by mobile device 105, and memory 430 stores the instructions executed by processor 420 and information used by processor 420.

Mobile device 105 may be any type of wireless device capable of communicating with network node 110 or another mobile device 105 over radio signals. Examples of mobile device 105 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, other wireless device capable of D2D operation, or other device that can provide wireless communication. Mobile device 105 may also be referred to as user equipment (UE), a station (STA), or a terminal in some embodiments. The mobile device 105 may also be radio communication device, target device, device to device mobile device 105, machine type mobile device 105 or mobile device 105 capable of machine to machine communication, a sensor equipped with mobile device 105, iPAD, Tablet, mobile terminals, smart phone, laptop embedded equipped (LEE), laptop mounted equipment (LME), USB dongles, Customer Premises Equipment (CPE).

Processor 420 may include any suitable combination of hardware and software implemented in one or more modules to execute instructions and manipulate data to perform some or all of the described functions of mobile device 105. In some embodiments, processor 420 may include, for example, one or more computers, one more programmable logic devices, one or more central processing units (CPUs), one or more microprocessors, one or more applications, other logic, and/or any suitable combination of the preceding. Processor 420 may include analog and/or digital circuitry configured to perform some or all of the described functions of mobile device 105. For example, processor 420 may include resistors, capacitors, inductors, transistors, diodes, and/or any other suitable circuit components.

Memory 430 is generally operable to store instructions, such as a computer program, software, an application including one or more of logic, rules, algorithms, code, tables, and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of mobile device 105 may include additional components beyond those shown in FIG. 4 that may be responsible for providing certain aspects of the wireless device's functionality, including any of the functionality described above and/or any additional functionality (including any functionality necessary to support the solution described above).

In particular embodiments, mobile device 105 may include a determining module, a communication module, a receiver module, an input module, and a display module. The determining module may perform the processing functions of mobile device 105. For example, the determining module may access control information and may determine an expected packet loss rate based on that control information. As another example, the determining module may generate an indication of the expected packet loss rate. As yet another example, the deteimining module may perform a procedure according to information about that procedure received from a network node 110 of the network 100. In certain embodiments, the determining module may include or be included in processor 420. The determining module may include analog and/or digital circuitry configured to perform any of the functions of the determining module and/or processor 420.

The communication module may perform the transmission functions of mobile device 105. For example, the communication module may communicate the indication of the expected packet loss rate to network node 110 of network 100. As another example, the communication module may transmit messages to network node 110 of network 100. In certain embodiments, the communication module may include or be included in radio 410. The communication module may include a transmitter and/or a transceiver. The communication module may include circuitry configured to wirelessly transmit messages and/or signals. In particular embodiments, the communication module may receive messages and/or signals for transmission from the determining module.

The receiving module may perform the receiving functions of mobile device 105. For example, the receiving module may receive information about a procedure from network node 110 of network 100. As another example, the receiving module may receive messages from network node 110 of network 100. In certain embodiments, the receiving module may include or be included in radio 410. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for mobile device 105. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of mobile device 105. The display module may include the display and/or any appropriate circuitry and hardware configured to present signals on the display. The display module may receive signals to present on the display from the determining module.

Figure 5:
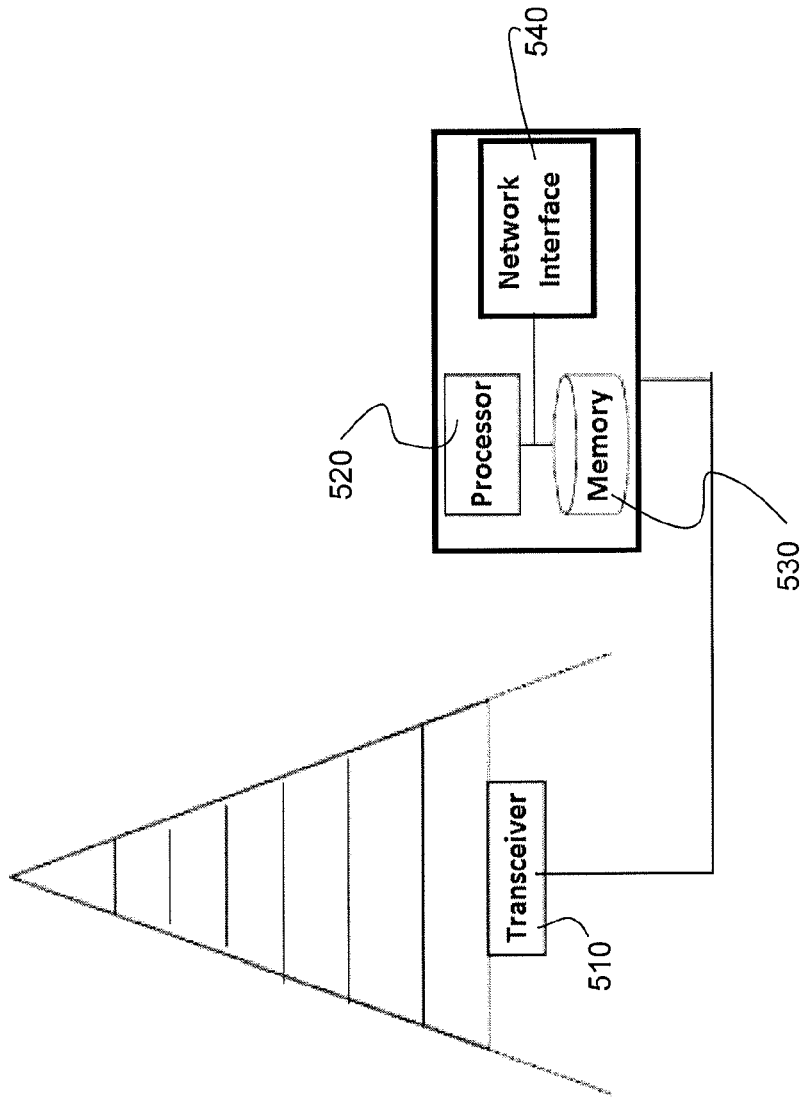
FIG. 5 is a block diagram illustrating an example embodiment of a network node of the network of FIG. 1.

FIG. 5 is a block diagram illustrating an example embodiment of a network node 110 of the network 100 of FIG. 1. As illustrated in FIG. 5, network node 110 may include transceiver 510, processor 520, memory 530 and network interface 540. This disclosure contemplates network node 110 using each of transceiver 510, processor 520, memory 530, and network interface 540 along or in combination to perform any of the functions described herein as being performed by network node 110, cell 120, and/or network 100. For example, in some embodiments, transceiver 510 facilitates transmitting wireless signals to and receiving wireless signals from mobile device 105 (e.g., via an antenna), processor 520 executes instructions to provide some or all of the functionality described above as being provided by network node 110 or network 100, memory 530 stores the instructions executed by processor 520, and network interface 540 communicates signals to backend network components, such as a gateway, switch, router, Internet, Public Switched Telephone Network (PSTN).

Examples of network node 110 include an eNodeB, a node B, a base station, a wireless access point (e.g., a Wi-Fi access point), a low power node, a base station controller, a radio network controller, a relay, a donor node controlling relay, a base transceiver station (BTS), transmission points, transmission nodes, RRU, RRH, nodes in a distributed antenna system (DAS), a core network node, an MME. Network node 110 may be any kind of network node 110 which may comprise of base station, radio base station, base transceiver station, base station controller, network controller, evolved Node B (eNB), Node B, RNC, relay node, positioning node, E-SMLC, location server, repeater, access point, radio access point, Remote Radio Unit (RRU) Remote Radio Head (RRH), multi-standard radio (MSR) radio node such as MSR BS nodes in distributed antenna system (DAS), SON node, O&M, OSS, MDT node, Core network node, MME.

The embodiments are applicable to any RAT or multi-RAT systems, which involve measurement without gaps and/or multi-carrier operation (e.g., LTE FDD/TDD, WCDMA/HSPA, GSM/GERAN, Wi Fi, CDMA2000). The embodiments are also applicable to procedures or radio operations performed by the mobile device 105 in any RRC state (e.g., RRC connected state, CELL_DCH state, idle state, idle mode, CELL_PCH, URA_PCH, CELL_FACH).

Processor 520 may include any suitable combination of hardware and software implemented in one or more modules to execute instructions and manipulate data to perform some or all of the described functions of network node 110. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for network node 110, send output from network node 110, perform suitable processing of the input or output or both, communicate to other devices, or any combination of the preceding. Network interface 540 may include appropriate hardware (e.g., port, modem, network interface card) and software, including protocol conversion and data processing capabilities, to communicate through a network.

Other embodiments of network node 110 may include additional components beyond those shown in FIG. 5 that may be responsible for providing certain aspects of the access node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

In particular embodiments, mobile device 105 is able to receive and/or transmit data to more than one cells 120. In other words, mobile device 105 can be configured to operate with more than one serving cell. In such situations, mobile device 105 is described as being capable of multicarrier or carrier aggregation (CA) operation. CA is also called "multi-carrier system", "multi-cell operation", "multi-carrier operation", "multi-carrier" transmission and/or reception.

Serving carriers may be primary carriers and secondary carriers. Generally, the primary or anchor carrier carries the packets used for signaling. The primary carrier exists in both uplink and downlink directions in multicarrier operation. In case there is a single uplink carrier, the primary carrier is that carrier. The network may assign different primary carriers to different mobile devices 105 operating in the same sector or cell.

In certain embodiments, mobile device 105 takes radio measurements on a serving cell and neighbor cells over some known reference symbols or pilot sequences. The measurements may be done on cells on an intra-frequency carrier, inter-frequency carrier(s) as well as on inter-RAT carriers(s) (depending upon mobile device's 105 capability whether it supports that RAT).

In multicarrier scenario, the mobile device 105 may perform the measurements on the cells on the primary carrier as well as on the cells on one or more secondary carriers. A CA capable mobile device 105 may also perform inter-frequency measurements without measurement gaps since mobile device 105 has a broadband receiver and/or multiple receivers.

The mobile device 105 may perform measurements and/or operations on cells on frequencies belonging to non-serving carrier (e.g., inter-frequency and/or inter-RAT measurements) or secondary carriers with or without measurement gaps (e.g., compressed mode gaps in WCDMA/HSPA) depending upon its capability. When performing measurements on cells belonging to non-serving carrier(s) or secondary carriers without measurement gaps, the mobile device 105 may retune its receiver bandwidth (e.g., changing center frequency of its oscillator). This in turn may also cause interruption of signals on the serving cell of the mobile device 105.

Examples of intra-frequency and inter-frequency measurements in LTE are Reference symbol received power (RSRP) and Reference symbol received quality (RSRQ). Examples of intra-frequency and inter-frequency measurements in HSPA are Common pilot channel received signal code power (CPICH RSCP) and CPICH Ec/No.

When serving cell is HSPA the inter-RAT measurements may comprise of inter-RAT LTE, inter-RAT GSM, inter-RAT CDMA2000, and/or inter-RAT wireless LAN. Examples of GSM measurements are GSM Carrier RSSI. When serving cell is LTE FDD the inter-RAT measurements may comprise of inter-RAT LTE TDD, inter-RAT LTE HSPA, inter-RAT GSM, inter-RAT CDMA2000, and/or inter-RAT wireless LAN. When serving cell is LTE TDD the inter-RAT measurements may comprise of inter-RAT LTE TDD, inter-RAT LTE HSPA, inter-RAT GSM, inter-RAT CDMA2000, and/or inter-RAT wireless LAN.

The mobility measurement may also comprise of identifying or detecting a cell, which may belong to LTE, HSPA, CDMA2000, and/or GSM. The cell detection comprises identifying at least the physical cell identity (PCI), primary scrambling code (PSC) or base station identity code (BSIC) and subsequently performing the signal measurement (e.g., RSRP, RSCP or RSSI) of the identified cell. The mobile device 105 may also acquire the cell global ID (CGI) of a cell. In HSPA and LTE the serving cell can request the mobile device 105 to acquire the system information of the target cell. More specifically the SI is read by the mobile device 105 to acquire the cell global identifier (CGI), which uniquely identifies a cell, of the target cell. The mobile device 105 also may be requested to acquire other information such as CSG indicator, CSG proximity detection, or any other appropriate information from the target cell.

Examples of positioning measurements in LTE are reference signal time difference (RSTD) for OTDOA positioning method and UE RX-TX time difference measurement for E-CID positioning method. The mobile device 105 RX-TX time difference measurement includes measurements on downlink reference signal as well as on uplink transmitted signals.

The radio measurements performed by the mobile device 105 are used by the mobile device 105 for one or more radio operational tasks. Examples of such tasks are reporting the measurements to the network, which in turn may use them for various tasks. For example in RRC connected state the mobile device 105 reports radio measurements to the serving node. In response to the reported mobile device 105 measurements, the serving network node takes certain decisions (e.g., it may send mobility command to the mobile device 105 for the purpose of cell change). Examples of cell change are handover, RRC connection re-establishment, RRC connection release with redirection, primary carrier change in CA, primary carrier change in primary carrier. In idle or low activity state example of cell change is cell reselection. In another example, the mobile device 105 may itself use the radio measurements for performing tasks such as cell selection and/or cell reselection.

In particular embodiments, a multicarrier secondary cell setup refers to a procedure which enables the network node to at least temporarily setup or release the use of a secondary cell, in downlink and/or uplink by the CA capable mobile device 105. The secondary cell setup or release procedure or command can perform any one or more of: configuration of secondary cell(s), de-configuration of secondary cell(s), activation of secondary cell(s), and deactivation of secondary cell(s).

In certain embodiments, the configuration procedure is used by the serving radio network node (e.g., eNode B in LTE or Node B in HSPA) to configure a CA capable mobile device 105 with one or more SCells (downlink secondary cell, uplink secondary cell, or both). On the other hand, the de-configuration procedure is used by the eNode B to de-configure or remove one or more already configured secondary cells (downlink secondary cell, uplink secondary cell, or both). The configuration or de-configuration procedure is also used to change the current multi-carrier configuration (e.g., for increasing or decreasing the number of secondary cells or for swapping the existing secondary cells with new ones). The configuration and de-configuration are done by the eNode B and by RNC using RRC signaling in LTE and HSPA respectively.

In some embodiments, the serving radio network node (e.g., eNode B in LTE or Node B in HSPA) can activate one or more deactivated secondary cells or deactivate one or more secondary cells on the corresponding configured secondary carriers. The primary cell is usually activated. The configured secondary cells are initially deactivated upon addition and after a cell change (e.g., handover). In HSPA the activation and deactivation command is sent by the Node B via HS-SCCH. In LTE the activation and deactivation command is sent by the eNode B via MAC control element (MAC-CE). The deactivation of secondary cells saves mobile device's 105 battery power.

The secondary cell setup or release (e.g., when secondary cell is configured, de-configured, activated or deactivated) may cause glitch or interruption of operation on the primary cell or any other activated secondary cell. The operation herein means reception and/or transmission on signals. The glitch in uplink and/or downlink typically occurs when mobile device 105 has single radio chain to receive and/or transmit more than one carrier. However the glitch may even occur when mobile device 105 has independent radio chains on the same chip. The glitch mainly occurs when the carrier aggregation (CA) capable mobile device 105 changes its reception and/or transmission bandwidth (BW) from single-carrier to multiple-carrier operation or vice versa. In order to change the BW the mobile device 105 has to reconfigure its RF components in the RF chain (e.g., RF filter, power amplifier (PA)). The interruption can vary between 2-5 ms. The interruption is caused due to several factors including RF tuning to reconfigure BW (e.g., shorten or extend), setting or adjusting of radio parameter such as AGC setting.

During the interruption period the mobile device 105 may not receive from and/or transmit any signal or information to the network. During the interruption the mobile device 105 may neither perform measurements due to its inability to receive and/or transmit signals. This leads to the loss or dropping of packets transmitted between the mobile device 105 and its serving cell(s). It should be noted that the interruption may impact several or all active carriers, and may affect both the uplink and downlink.

The overall serving cell or neighbor cell measurement performed by the mobile device 105 may comprise non-coherent averaging of 2 or more basic non-coherent averaged samples over a measurement period. The exact sampling depends upon the implementation and is generally not specified. The mobile device 105 may obtain the overall measurement quantity result by collecting four non-coherent averaged samples or snapshots (each of 3 ms length in this example) during the physical layer measurement period (e.g., 200 ms) when no DRX is used or when DRX cycle is not larger than 40 ms. The same measurement principle applies to UTRAN measurements (e.g., CPICH RSCP).

When performing measurement on cells on non-serving carrier or secondary carrier with deactivated secondary cell(s) without gaps the mobile device 105 typically retunes its receiver. Therefore the interruption in downlink and/or uplink of serving cell occurs before and after each measurement sample (e.g., when the bandwidth is extended from 20 MHz to 40 MHz) and also when it is reverted back to the BW of the serving carriers (e.g., from 40 MHz to 20 MHz). The interruption may also occur when serving carrier and non-serving carrier or secondary carrier are on the same chip. The interruption in each direction in this case can be between 2-5 ms since mobile device 105 has to retune the center frequency and the bandwidth of the downlink. The mobile device 105 does measurements on cells of secondary carrier with deactivated secondary cell(s) and non-serving carriers on regular basis which is configurable by the eNB. Therefore the data loss on primary cell and activated secondary cell(s) will also occur whenever the cells of secondary carrier with deactivated secondary cell(s) or non-serving carrier are measured.

Generally, the mobile device 105 informs the network node 110 of packet loss or whether interruption occurs on one or more serving cells when performing radio operations on non-serving or secondary carriers (e.g., measuring on carrier(s) without gaps and/or performing secondary cell setup or release of secondary cell). The network node 110 based on the received information adapts the radio procedures and configures the mobile device 105 with the adapted procedures so the mobile device 105 may perform the corresponding radio operations according to the procedures.

In particular embodiments, the mobile device 105 may determine whether one or more packets transmitted between a serving cell and the mobile device 105 are lost or expected to be lost when the mobile device 105 performs one or more radio operations on any non-serving carrier or secondary carrier. The mobile device 105 may then send an indication based on the determination to the first network node and/or another network node.

In certain embodiments, the network node 110 may receive from the mobile device 105 or from another network node 110 an indication whether one or more packets transmitted between a serving cell and the mobile device 105 are lost or expected to be lost when the mobile device 105 performs one or more radio operations on any non-serving carrier or secondary carrier. The network node 110 may then configure the mobile device 105 with one or more radio operations based on the received indication (e.g., configuring measurement gaps for measuring on non-serving carrier if packet loss occurs).

In particular embodiments, the network node 110 may be aware of mobile device 105 capability in terms of loss in serving cell performance when the mobile device 105 performs an operation on a non-serving carrier and/or on secondary carrier, that includes returning or interruption of mobile device 105 radio receiver/transmitter. In certain embodiments, the network node 110 may decide whether to configure the mobile device 105 with measurement gaps or not for measuring on non-serving carriers. This gives sufficient freedom to the network node 110. For example if packet loss rate is larger than a threshold then the network node 110 may decide to configure measurement gaps. In some embodiments, the network node 110 may configure appropriate non-serving carriers for mobile device 105 measurements without gaps such that no interruption or packet loss occurs on the serving cell. In certain embodiments, the network node 100 may more efficiently use the scheduling grant or more specifically the scheduling grants are not wasted since packet loss is avoided or minimized.

In particular embodiments, a mobile device 105 is served by a first network node 110 in a first cell 120 operating on a first carrier frequency (f1). The first cell 120 is therefore also called as the serving cell or primary cell of the mobile device 105. The mobile device 105 is capable of at least performing one or more radio measurements and/or one or more radio operations on at least one cell 120 operating on a second carrier frequency (f2) without measurement gaps. The carrier (f2) may be a non-serving carrier frequency or can be configured or being configured as secondary carrier if mobile device 105 is CA capable. When configured or being configured as secondary carrier then at least one cell of the said secondary carrier is configured or being configured as secondary cell. The at least second cell 120 may be served by the first network node 110 or another network node 110.

The transmission of signals or transmission opportunities between the mobile device 105 and the first cell 120 is interrupted during the time instances or bursts of periods when the mobile device 105 performs one or more of the following radio operations on carrier (f2): one or more radio measurements on at least one cell on f2 if f2 is non-serving carrier, one or more radio measurements on at least one cell on f2 if f2 is secondary carrier with deactivated secondary cell, secondary cell setup or release operation on f2 if f2 is secondary carrier (e.g., any of activation of secondary cell, deactivation of secondary cell, configuration of secondary carrier or de-configuration of secondary carrier). This disclosure contemplates scenarios where the mobile device 105 is configured to measure on any number of non-serving and/or secondary carriers (e.g., f2, f3, . . . , fn). This disclosure also contemplates scenarios where the mobile device 105 is configured with a combination of non-serving and secondary carriers.

The interruption of signals between the mobile device 105 and the serving cell leads to loss or degradation of serving cell performance. The interruptions may affect the primary cell and/or one or more active secondary cells. The loss in serving cell performance can be expressed in terms of metric such as loss of packets or packet loss rate or number of packets lost. The packet herein refers to any 'block of data' such as transport block sent over radio interface in uplink or downlink. The packet loss rate or number of lost packets is typically estimated over certain period of time (e.g., measurement time of a radio measurement and/or a pre-defined time). In one example the number of lost packets is expressed as total number of missed ACK/NACK in response to a continuous transmission of data to the mobile device 105 from its serving cell over certain time period. In LTE the transmission opportunity or scheduling instance is 1 ms (e.g., 1 TTI). Therefore for example the number of packets lost in LTE is 10 if the mobile device 105 is unable to transmit 10 ACK/NACK in uplink in response to continuous downlink transmission over a period of 100 ms. In this example the corresponding packet loss rate is 10% or 0.1.

In particular embodiments, the mobile device 105 determines whether one or more packets transmitted between the mobile device 105 and the serving cell (first cell on f1) is lost or is expected to be lost when the mobile device 105 performs one or more radio operations on at least one cell on carrier f2. Typically one packet (e.g., transport block) is transmitted over one scheduling occasion or duration; therefore number of packet loss corresponds to loss of scheduling opportunities. The mobile device 105 may determine this for plurality of serving cell if the mobile device 105 is operating or is capable to operate with multiple serving cells. The determination can be performed based on or more of the following: stored information, which is part of mobile device 105 radio access capability information, historical data of lost packets, which is collected and stored based on previous radio operations performed by the mobile device 105 on f2, ongoing one or more radio operations performed on f2, and configuration of one or more radio operations to be performed on f2.

The mobile device 105 may then send, report, transmit, or signal the first network node at least an indication based on the determination of packet loss opportunities. The indication in one example may comprise of simple indicator informing the first network node whether it causes packet loss or not when performing one or more radio operations on f2. In another example the mobile device 105 may provide more detailed or additional information (e.g., number of packets lost or packet lost rate). The mobile device 105 may also report the indication to another network nodes (e.g., core network node and/or positioning node). The indication may be sent at one or more occasions (e.g., periodically, during initial setup, and/or after cell change).

In certain embodiments, the mobile device 105 may also determine the packet loss rate and report the corresponding indication to the first network node or another network node based on received request received from the first network node or another network node. The receive request may comprise of a message (e.g., information element (IE) sent via RRC, LPP) asking the mobile device 105 to send the said indication or even additional information. The received message may contain additional information, which is used by the mobile device 105 for determining the packet loss and report the corresponding information to the network node(s). The additional information may be one or more of the following: packet loss metric to be used for reporting results (e.g., packet loss rate, number of packets lost or expected to be lost); duration over which the packet loss metric is to be determined; direction in which packet loss metric is to be determined (e.g., uplink, downlink or both); packet loss information based on one or both of: mobile device 105 capability related to packet loss rate and current configuration of carriers at the mobile device 105 (e.g., number and frequencies of non-serving carriers and/or secondary carriers). Serving cell whose packet loss is to be determined (e.g., primary cell, secondary cell(s), or both); and one or more mobile device 105 radio operations for which the packet loss is to be determined by the mobile device 105 (e.g., inter-frequency measurements without gaps, inter-RAT measurements without gaps, and applying secondary cell setup or request command).

In certain embodiments, the indication transmitted by the mobile device 105 may contain one or more additional set or pieces of information, which is included by the mobile device 105 based on any one or more principles: autonomous, predefined rules and explicit request received from the network node. The additional set of information may comprise: type of packet loss metric used for reporting results; packet loss rate or number of packets lost or number of packets successfully received; duration over which the packet loss metric is estimated; direction in which packet loss metric is determined (e.g., uplink, downlink or both); indication whether the determined packet loss metric is related to mobile device 105 capability and/or current configuration of carriers at the mobile device 105 by the network node (e.g., number and frequencies of non-serving carriers and/or secondary carrier); serving cell whose packet loss metric is determined (e.g., primary cell, secondary cell(s), or both); threshold (R0) related to packet loss metric used for triggering the reporting of packet loss metric results (e.g., send packet loss rate if R0 is above 1%); one or more mobile device 105 radio operations for which the packet loss metric is determined by the mobile device 105 (e.g., when the mobile device 105 has: performed inter-frequency measurements without gaps, performed inter-RAT measurements without gaps, and applied secondary cell setup or request command); one or more frequency bands on which when performing one or more operations (listed above) the mobile device 105 does cause any packet loss or loss of any opportunity for packet transmission between the mobile device 105 and one or more of its serving cells, the mobile device 105 may further indicate one or more specific radio operations (e.g., inter-frequency measurements without gaps) which cause packet loss on indicated bands; association between one or more frequency bands used for serving cell(s) and one or more frequency bands on which when performing one or more operations (listed above) the mobile device 105 does cause any packet loss or loss of any opportunity for packet transmission between the mobile device 105 and one or more of its serving cells, the mobile device 105 may further indicate one or more specific radio operations (e.g., inter-frequency measurements without gaps) which cause packet loss on the associated lists of frequency bands; timing information of the occurrence of the interruptions or instances when packets are lost or expected to be lost by the mobile device 105, the timing information may comprise of one or more of: starting reference time (e.g., SFN=0), periodicity of each occurrence (e.g., 20 ms, 4 frames, SFN mod 4) and duration of interruption (e.g., 2 subframes, 4 ms).

As an example, Table 1 illustrates an example of an indication including list of frequency bands on which when performing radio operations may cause packet loss on one or more mobile device's 105 serving cells is illustrated in table 1. In this example, mobile device 105 supports 4 frequency bands (bands 1-4) but packet loss occurs only when mobile device 105 performs one or more radio operations on a carrier on band 2 and band 3. In this case the packet loss occurs regardless of the frequency band of the serving cell.

TABLE 1

Example of an indication including list of bands on which when performing radio operations may cause packet loss on one or more mobile device's serving cells

| Supported bands | Indication whether or not packet loss occurs on serving cell(s) when performing one or more radio operations |
| --- | --- |
| Band 1 | N |
| Band 2 | Y |
| Band 3 | Y |
| Band 4 | N |

N = No; no packet loss occurs
Y = Yes; packet loss occurs

As another example, Table 2 shows an example of an indication indicating a relation or an association between list of serving cell(s)' frequency bands and list of frequency bands on which when the mobile device 105 performs one or more radio operations may cause packet loss on one or more serving cells of the mobile device 105. In this case the occurrence of packet loss depends also on the frequency band of the serving cell(s) of the mobile device 105. For example the packet loss on band 1 occurs only when the mobile device 105 performs one or more radio operations on cell on carrier frequency belonging to band 3.

TABLE 2

Example of an indication indicating relation or association between list of serving cell(s)' bands and bands on which when performing radio operations may cause packet loss on one or more mobile device's serving cells

| Band of serving cell(s) | Band on which UE performs one or more radio operations | | | |
| --- | --- | --- | --- | --- |
| | Band 1 | Band 2 | Band 3 | Band 4 |
| Band 1 | N | N | Y | N |
| Band 2 | Y | Y | Y | N |
| Band 3 | Y | N | N | Y |
| Band 4 | N | N | N | N |

N = No; no packet loss occurs
Y = Yes; packet loss occurs

In certain embodiments, the mobile device 105 may also collect statistics or information about the packet loss, store or log them and report the results to the network node as part of minimization of drive test (MDT). The reported results could also contain additional information such as location when logging was done, time when logging was done or time stamp of the logging. The mobile device 105 may initiate logging based on request received from the network node. The results can be collected over certain time duration, which can be pre-defined or configured by the network node.

In particular embodiments, the mobile device 105 in response to sending indication and additional information to the network node may trigger the network node to configure the mobile device 105 with one or more radio procedures to perform one or more radio operational tasks (e.g., measurements on f2, and/or secondary cell setup or release on f2). The request may comprise of specific operations to be performed on cells of one or more carriers which may belong to specific frequency bands. The request may be received from the first network node or from another network node such as positioning node. The mobile device 105 in response to receiving the request may perform the requested tasks. In case of measurements the mobile device 105 may also report the measurement results to the network node and/or use it for one or more autonomous actions such as cell change and/or positioning.

In particular embodiments, the network node (first network node or another network node (e.g., non-serving node such as positioning node)) receives a message or an indication informing at least if subset of packets transmitted between the mobile device 105 and at least the first cell on carrier f1 is lost or dropped when mobile device 105 performs one or more radio operations on at least one cell on f2. The indication is received directly from the mobile device 105 or from another network node (e.g., neighboring eNB) which contains or stores the said indication or information about mobile device 105 packet loss performance. The received indication may also contain additional information, as previously described.

The network node may then configure, based on the received indication, the mobile device 105 with one or more radio procedures enabling the mobile device 105 to perform one or more radio operations on one or more cells on carrier f2. The network node may even decide based on received indication whether to skip certain radio procedures or not. Examples of radio procedures include: deciding whether or not to configure measurement gaps for enabling the mobile device 105 to measuring on f2; configuring the mobile device 105 to measure on certain 12 with measurement gaps if the reported packet loss rate is above a threshold (e.g., 1% or above); and procedure for secondary cell setup or release on f2.

In certain embodiments, the network may use the received indication or any related information for one or more internal tasks. Examples of such tasks are scheduling, modification of measurement configuration sent to the mobile device 105, and/or storing the received information and using it at a future time. Other examples include: the network node configures the mobile device 105 for measuring on non-serving carrier(s) without gaps on bands which does not cause packet loss; if there is large amount of data in buffer to schedule and the indicated packet loss rate is above a threshold then the network node configures the mobile device 105 with measurement gap for measuring on non-serving carrier(s); and adapting scheduling by avoiding scheduling during subframes or time instances when mobile device 105 is expected to drop packets or cause interruption, this adaptation is done if network node knows the time instances of occurrences of packet loss or interruption.

In some embodiments, the network node may forward the received indication or any information related to mobile device 105 packet loss to other network nodes. For example the first network node may forward it to neighbouring network nodes (e.g., serving eNB to another eNB over X2 and/or serving eNB to positioning node over LPPa).

In particular embodiments, an apparatus includes a memory that may store control information. The apparatus further includes a processor communicatively coupled to the memory. The processor may determine, based at least in part upon the control information, an indication of an expected packet loss rate associated with performing a radio operation. The processor may communicate the indication of the expected packet loss rate to a network node. In certain embodiments, the processor may receive, in response to communicating the indication of the expected packet loss rate, information about a procedure for performing the radio operation. The processor may perform the radio operation according to the procedure.

In certain embodiments, the processor may receive a request from the network node for the indication of the expected packet loss rate. The determination of the expected packet loss rate may be made in response to receiving the request. In some embodiments, the processor may communicate a duration over which the expected packet loss rate is determined. The processor may communicate a direction of transmission of packets in which the expected packet loss rate is determined and/or a serving cell on which the radio operation is to be performed, a frequency band of the expected packet loss rate. The processor may communicate an indication whether the expected packet loss rate is based on at least one of a configuration of carriers and a capability. In some embodiments, the processor may communicate a starting reference time of the expected packet loss rate, a duration of the expected packet loss rate, and/or a periodicity of the expected packet loss rate.

In particular embodiments, a mobile device may perform a method. The mobile device may store control information. The mobile device may determine, based at least in part upon the control information, an indication of an expected packet loss rate associated with performing the radio operation The mobile device may communicate the indication of the expected packet loss rate. In certain embodiments, the mobile device may receive, in response to communicating the indication of the expected packet loss rate, information about a procedure for performing the radio operation. The mobile device may perform the radio operation according to the procedure. In some embodiments, the mobile device may receive a request from the network node for the indication of the expected packet loss rate. The mobile device may determine the expected packet loss rate in response to receiving the request.

In certain embodiments, the mobile device may communicate a duration over which the expected packet loss rate is determined. The mobile device may communicate a direction of transmission of packets in which the expected packet loss rate is determined. The mobile device may communicate a serving cell on which the radio operation is to be performed. The mobile device may communicate a frequency band of the expected packet loss rate. The mobile device may communicate an indication whether the expected packet loss rate is based on at least one of a configuration of carriers and a capability. In some embodiments, the mobile device may communicate a starting reference time of the expected packet loss rate, a duration of the expected packet loss rate, and/or a periodicity of the expected packet loss rate.

In particular embodiments, a network node includes a processor that may receive an indication of an expected packet loss rate associated with performing a radio operation by a mobile device. The processor may determine, based at least in part upon the indication of the expected packet loss rate, information about a procedure for performing the radio operation. The processor may communicate the information about the procedure to the mobile device. In certain embodiments, the processor may schedule, in response to receiving the indication of the expected packet loss rate, a measurement gap based at least in part upon the indication of the expected packet loss rate. In some embodiments, the processor may determine that a serving cell should be left in an activated state based at least in part upon the indication of the expected packet loss rate. In certain embodiments, the processor may forward the indication of the expected packet loss rate to another network node. In some embodiments, the processor may communicate a request for the indication of the expected packet loss rate, and receive, in response, the indication of the expected loss rate.

In certain embodiments, the processor may receive a duration over which the expected packet loss rate is determined. The processor may receive a direction of transmission of packets in which the expected packet loss rate is determined. The processor may receive a serving cell on which the radio operation is to be performed. The processor may receive a frequency band of the expected packet loss rate. The processor may receive an indication whether the expected packet loss rate is based on at least one of a configuration of carriers and a capability. In some embodiments, the processor may receive a starting reference time of the expected packet loss rate, a duration of the expected packet loss rate, and/or a periodicity of the expected packet loss rate.

In particular embodiments, a network node may perform a method. The network node may receive an indication of an expected packet loss rate associated with performing a radio operation. The network node may determine, based at least in part upon the indication of the expected packet loss rate, information about a procedure for performing the radio operation. The network node may communicate the procedure. In certain embodiments, the network node may schedule, in response to receiving the indication of the expected packet loss rate, a measurement gap based at least in part upon the indication of the expected packet loss rate. In some embodiments, the network node may determine that a serving cell should be left in an activated state based at least in part upon the indication of the expected packet loss rate. In certain embodiments, the network node may forward the indication of the expected packet loss rate to another network node.

In some embodiments, the network node may communicate a request for the indication of the expected packet loss rate. The network node may receive, in response to communicating the request, the indication of the expected loss rate. In certain embodiments, the network node may receive a duration over which the expected packet loss rate is determined. The network node may receive a direction of transmission of packets in which the expected packet loss rate is determined. The network node may receive a serving cell on which the radio operation is to be performed. The network node may receive a frequency band of the expected packet loss rate. The network node may receive an indication whether the expected packet loss rate is based on at least one of a configuration of carriers and a capability. In some embodiments, the network node may receive a starting reference time of the expected packet loss rate, a duration of the expected packet loss rate, and/or a periodicity of the expected packet loss rate.

In particular embodiments, the radio operation is to be performed on one or more cells of a second serving carrier frequency, and the expected packet loss rate associated with performing the radio operation includes an expected packet loss rate for operations performed on a first serving cell. In some embodiments, the radio operation is to be performed on a non-serving carrier frequency, and the expected packet loss rate associated with performing the radio operation includes an expected packet loss rate for operations performed on a serving cell.

In particular embodiments, the control information includes statistics about packet loss, and the indication of the expected packet loss rate is determined based on the statistics. In some embodiments, the control information includes a threshold, and the processor communicates the indication of the expected packet loss rate if the expected packet loss rate exceeds the threshold. In certain embodiments, the control information includes a mobile device radio access capability, and the expected packet loss rate is determined based on the mobile device radio access capability. In some embodiments, the control information includes configured carriers at a mobile device, and the expected packet loss rate is determined based on the configured carriers. In certain embodiments, the radio operation may be an inter-frequency measurement without measurement gaps. The radio operation may be a configuration of a second serving cell. The radio operation may be a deconfiguration of the second serving cell, an inter-RAT measurement without measurement gaps. The radio operation may be an activation of the second serving cell, and a deactivation of the second serving cell. In some embodiments, the indication of the expected packet loss rate includes at least one of: a ratio of a number of lost packets to a number of transmitted packets over a time period, and/or a number of expected missed acknowledgments in response to a transmission of packets over the time period. In some embodiments, the procedure includes at least one of a time and frequency at which the radio operation is to be performed.

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The meanings of certain abbreviations include:
ABS Almost blank subframes
AGC Automatic Gain Control
ARFCN Absolute Radio Frequency Channel Number
BS Base station
CA Carrier aggregation
CGI Cell global identity
CRS Cell-specific reference signals
CSG Closed subscriber group
CSI Channel state information
DRX Discontinuous reception
eNB Evolved Node B, base station
E-UTRAN Evolved universal terrestrial radio access network
E-UTRA Evolved universal terrestrial radio access
E-UTRA FDDE-UTRA frequency division duplex
E-UTRA TDD E-UTRA time division duplex
EARFCN E-UTRAN Absolute Radio Frequency Channel Number
FDD Frequency division duplex
ICIC Inter-cell interference coordination
HBS Home base station
HRPD High rate packet data
HSPA High speed packet access
HPN High power node
LPN Low power node
LTE Long term evolution
M2M Machine-to-machine
MBSFN Multicast broadcast single frequency network
MDT Minimization of drive tests
PBCH Physical broadcast channel
PCC Primary component carrier
PCI Physical cell identity
PSS Primary synchronization signal
RAT Radio Access Technology
RRC Radio resource control
RSCP Received signal code power
RSRP Reference Signal Received Power
RSRQ Reference Signal Received Quality
RSSI Received signal strength indication
SCC Secondary component carrier
SIB System information block
SON Self-organizing networks
SSS Secondary synchronization signal
TDD Time division duplex
UARFCN UMTS Absolute Radio Frequency Channel Number
HO Handover
UE User equipment
RNC Radio Network Controller
BSC Base station Controller
PCell Primary Cell
SCell Secondary Cell
CPICH Common Pilot Channel
ECGI E-UTRAN Cell Global Identity
HSPA High Speed Packet Acess
GSM Global system for mobile communication
UARFCN UMTS ARFCN
UTRAN Universal terrestrial radio access network
UTRA universal terrestrial radio access
UTRA FDD UTRA frequency division duplex
UTRA TDD UTRA time division duplex
WLAN Wireless Local Area Network
GERAN GSM EDGE Radio Access Network
EDGE Enhanced Data rates for GSM Evolution
CDMA2000 Code division multiple access 2000
HRPD High rate packet data
SFN-SFN system frame number-system frame number
Inter-RAT Inter-radio access technology
CELL_PCH cell paging
URA_PCH UMTS registration area paging
CELL_DCH cell dedicated channel
CELL_FACH cell forward access channel
Ec/No chip energy/noise
CC Component Carrier
DL Downlink
O&M Operational and Maintenance
OSS Operational Support Systems
PDCCH Physical Downlink Control Channel
PRB Physical Resource Block
RB Resource Block
RRC Radio Resource Control SCC Secondary component carrier
SON Self Organizing Network

What is claimed is:

1. An apparatus comprising:
a memory configured to store control information;
a radio configured to communicate with a first network node over a first frequency, the first network node configured to provide service to the apparatus; and
a processor communicatively coupled to the memory and the radio and configured to:
determine that the radio should be tuned from the first frequency to a second frequency of a second network node that is not providing service to the apparatus;
in response to the determination that the radio should be tuned to the second frequency, determine, based at least in part upon the control information, an expected packet loss rate between the apparatus and the first network node caused by tuning the radio to the second frequency; and
communicate the expected packet loss rate to the first network node, wherein the first network node is configured to schedule, based on the expected packet loss rate, a measurement gap in which a packet that is to be communicated between the first network node and the apparatus is held for communication at a later time.

2. The apparatus of claim 1, wherein the processor is further operable to:
receive, in response to communicating the indication of the expected packet loss rate, information about a procedure for turning the radio to the second frequency; and
tune the radio to the second frequency according to the procedure.

3. The apparatus of claim 1, wherein the first network node is deactivated.

4. The apparatus of claim 1, wherein the processor is further configured to:
determine that a second radio operation is to be performed over a frequency of a carrier that is not providing service to the apparatus; and
determine a second expected packet loss rate comprising an expected packet loss rate for one or more operations performed on a serving cell.

5. The apparatus of claim 1, wherein the processor is further operable to communicate at least one of: a duration over which the expected packet loss rate is determined, a direction of transmission of packets in which the expected packet loss rate is determined, a serving cell on which tuning the radio is to be performed, a frequency band of the expected packet loss rate, and an indication whether the expected packet loss rate is based on at least one of a configuration of carriers and a capability.

6. The apparatus of claim 1, wherein:
the control information comprises statistics about packet loss; and
the indication of the expected packet loss rate is determined based on the statistics.

7. A method comprising:
storing, by a memory, control information;
communicating, by a radio, with a first network node over a first frequency, the first network node configured to provide service to a device;
determining, by a processor, that the radio should be tuned from the first frequency to a second frequency of a second network node that is not providing service to the device;
in response to the determination that the radio should be tuned to the second frequency, determining, by the processor, based at least in part upon the control information, an expected packet loss rate between the apparatus and the first network node caused by tuning the radio to the second frequency; and
communicating the expected packet loss rate to the first network node, wherein the first network node is configured to schedule, based on the expected packet loss rate, a measurement gap in which a packet that is to be communicated between the first network node and the device is held for communication at a later time.

8. The method of claim 7, further comprising:
receiving, in response to communicating the indication of the expected packet loss rate, information about a procedure for turning the radio to the second frequency; and
tuning the radio to the second frequency according to the procedure.

9. The method of claim 7, wherein the first network node is deactivated.

10. The method of claim 7, further comprising:
determining that a second radio operation is to be performed over a frequency of a carrier that is not providing service to the apparatus; and
determining a second expected packet loss rate comprising an expected packet loss rate for one or more operations performed on a serving cell.

11. The method of claim 7, further comprising communicating at least one of: a duration over which the expected packet loss rate is determined, a direction of transmission of packets in which the expected packet loss rate is determined, a serving cell on which tuning the radio is to be performed, a frequency band of the expected packet loss rate, and an indication whether the expected packet loss rate is based on at least one of a configuration of carriers and a capability.

12. The method of claim 7, wherein:
the control information comprises statistics about packet loss; and
the indication of the expected packet loss rate is determined based on the statistics.

13. A network node comprising:
a processor configured to:
receive an expected packet loss rate, wherein the expected packet loss rate is a packet loss rate that is expected to occur between a device and a first network node configured to provide service to the device if the device tunes its radio from a first frequency of the first network node to a second frequency of a second network node that is not providing service to the device;
determine, based at least in part upon the expected packet loss rate, information about a procedure for tuning the radio from the first frequency to the second frequency;
schedule, based on the expected packet loss rate, a measurement gap in which a packet that is to be communicated between the first network node and the device is held for communication at a later time; and
communicate the information about the procedure to the device.

14. The network node of claim 13 wherein the processor is further operable to schedule, in response to receiving the expected packet loss rate, a measurement gap based at least in part upon the expected packet loss rate.

15. The network node of claim 13, wherein the processor is further configured to determine that a serving cell should be left in an activated state based at least in part upon the expected packet loss rate.

16. The network node of claim 13, wherein the first network node is deactivated.

17. The network node of claim 13, wherein:

a second radio operation is to be performed over a frequency of a carrier that is not providing service to the device; and the processor further configured to receive a second expected packet loss rate comprising an expected packet loss rate for one or more operations performed on a serving cell.

18. A method comprising:

receiving an expected packet loss rate, wherein the expected packet loss rate is a packet loss rate that is expected to occur between a device and a first network node configured to provide service to the device if the device tunes its radio from a first frequency of the first network node to a second frequency of a second network node that is not providing service to the device;

determining, by a processor, based at least in part on the expected packet loss rate, information about a procedure for tuning the radio from the first frequency to the second frequency;

scheduling, based on the expected packet loss rate a measurement gap in which a packet that is to be communicated between the first network node and the device is held for communication at a later time; and communicating the information about the procedure to the device.

19. The method of claim 18 further comprising scheduling, in response to receiving the expected packet loss rate, a measurement gap based at least in part upon the expected packet loss rate.

20. The method of claim 18, further comprising determining that a serving cell should be left in an activated state based at least in part upon the expected packet loss rate.

21. The method of claim 18, wherein the first network node is deactivated.

22. The method of claim 18, further comprising receiving a second expected packet loss rate comprising an expected packet loss rate for one or more operations performed on a serving cell, wherein a second radio operation is to be performed over a frequency of a carrier that is not providing service to the device.

* * * * *